April 27, 1954 W. G. RUMBOLD 2,676,675
TRAILER BRAKE REMOTE CONTROL VALVE
Filed Nov. 7, 1950 2 Sheets-Sheet 2

INVENTOR.
WILLIAM G. RUMBOLD
BY
McMorrow, Berman & Davidson
ATTORNEYS

Patented Apr. 27, 1954

2,676,675

UNITED STATES PATENT OFFICE 2,676,675

TRAILER BRAKE REMOTE CONTROL VALVE

William G. Rumbold, Bloxom, Va.

Application November 7, 1950, Serial No. 194,536

3 Claims. (Cl. 188—3)

This invention relates to braking systems for automotive vehicles, and more particularly to systems for controlling the brakes of trailer vehicles.

The main object of the invention is to provide a novel and improved control system for trailer vehicles wherein the trailer brakes may be controlled by either the conventional foot brake pedal or by a hand controlled valve independently of the foot brake pedal.

A further object of the invention is to provide an improved control system for the brakes of trailer vehicles, said system being provided with means for at times eliminating operation of the trailer brakes by the foot brake pedal and allowing the trailer brakes to be manually controlled independently of the foot brake pedal of the vehicle.

Further objects and advantages of the invention will become apparent from the following description and claims, and from the accompanying drawings, wherein:

On vacuum suspended tractor brake systems, the trailing axle brakes can be simultaneously controlled by either the foot brake pedal or by a hand control valve, providing that a transfer valve is used.

On some types of trailers, such as log trailers, flat trailers, and the so-called "10 Wheeler," it is desirous at times to cut off the foot control to the trailing axle brakes while maintaining the hand control. Under certain conditions, due to the construction of the above mentioned types of vehicles, the use of the trailing axle brakes may be detrimental. This is due to the greater braking power of the trailing axle brakes and to the fact that less weight is carried by the trailing axle, whereby the wheels on the trailing axle may slide prior to those on the tractor when the brakes are applied. Furthermore, it is both costly and hazardous for all brakes to be applied at one time when the vehicle is empty.

The present invention contemplates the provision of a remote control valve arranged so that the foot control may be cut off with respect to the trailing axle while the hand control is still maintained for emergency in the event that the tractor brakes fail or provide insufficient braking. Said remote control valve may be located in any convenient location, such as beneath the footboard of the tractor, with the operating handle of said valve protruding above said footboard for the convenience of the driver.

Figure 1:
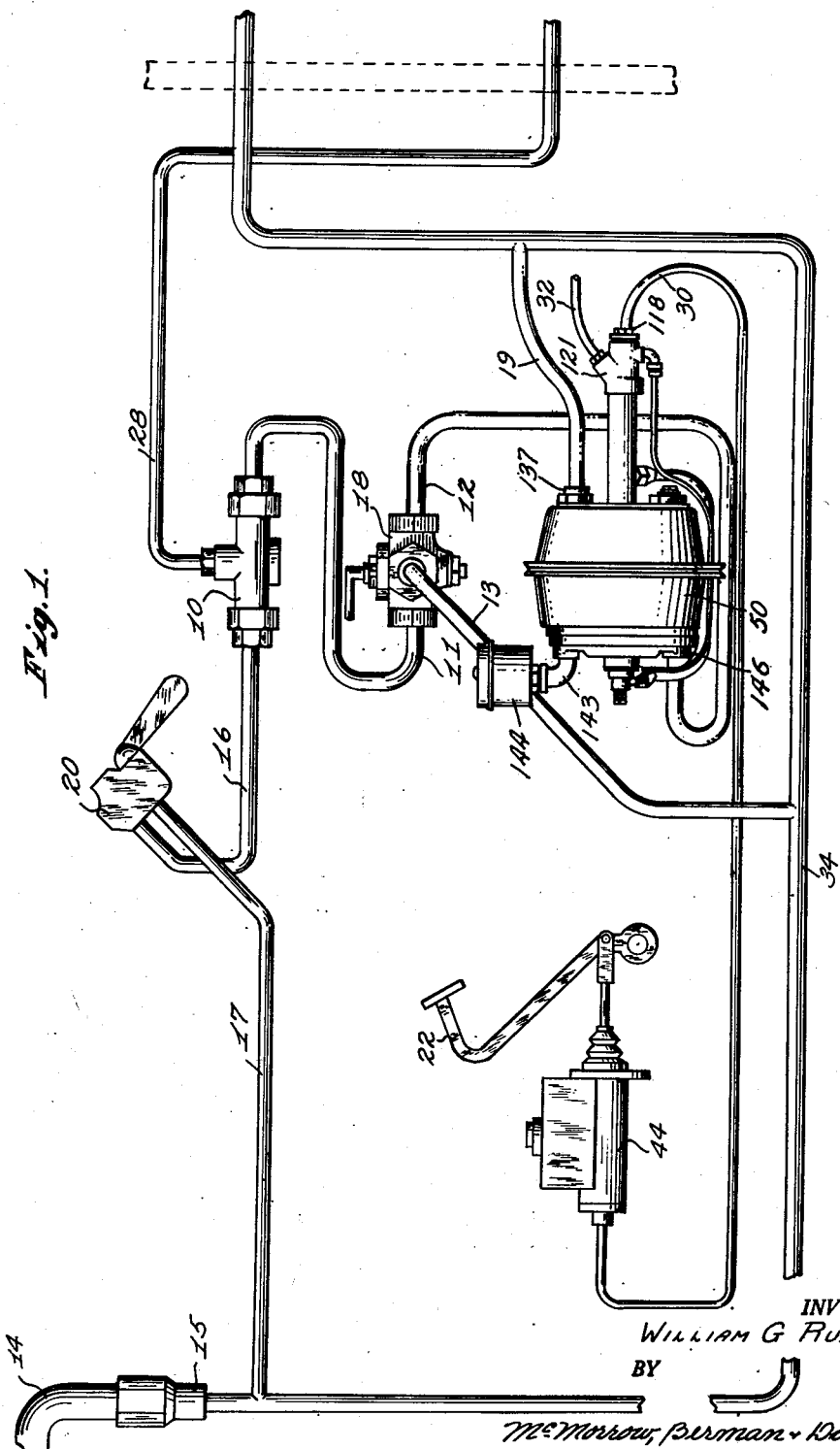
Figure 1 is a schematic diagram of a trailer brake control system embodying the improved control means of the present invention.

Referring to the drawings, Figure 1 illustrates the application of a remote control valve as above described, in a conventional brake system. The system shown in Figure 1 is of the Bendix type which employs a transfer valve 10, a hand control valve 20, and a tractor booster unit 50 including a valve. Designated at 14 is the vacuum supply line which is connected through a check valve 15 to the vacuum line 34 leading to the brakes on the trailer axle. Designated at 28 is the control line for said trailer axle brakes. Designated at 16 is the hand control line which is connected to one end of the transfer valve 10, as shown, said hand control line extending through the hand control valve 20 to the vacuum line 34, as by a conduit 17. In the normal position of the valve 20, the conduits 16 and 17 are in communication with each other through the valve, whereby vacuum is applied to said one end of the transfer valve 10. The valve 20 may be operated to disconnect the conduit 16 from the conduit 17 and to connect the conduit 16 to atmosphere, whereby atmospheric pressure is applied to said one end of the transfer valve 10.

Figure 4:
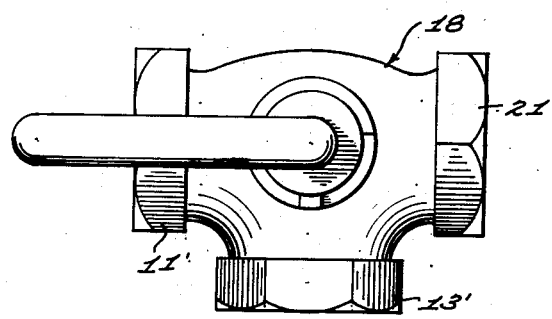
Figure 4 is a top plan view of the two-way remote control valve employed in the system of Figure 1 for at times eliminating operation of the system by the foot brake pedal.
Figure 6:
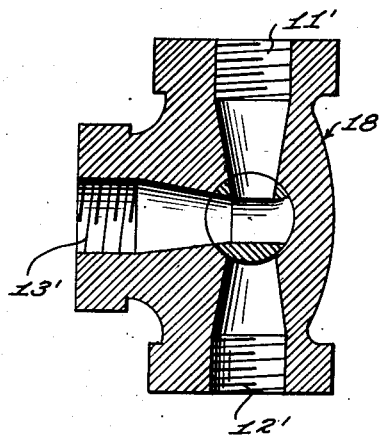
Figure 6 is a horizontal cross sectional view taken through the remote control valve of Figures 4 and 5 showing said valve in a position wherein operation by the foot brake pedal of the vehicle is cut off.
Figure 5:
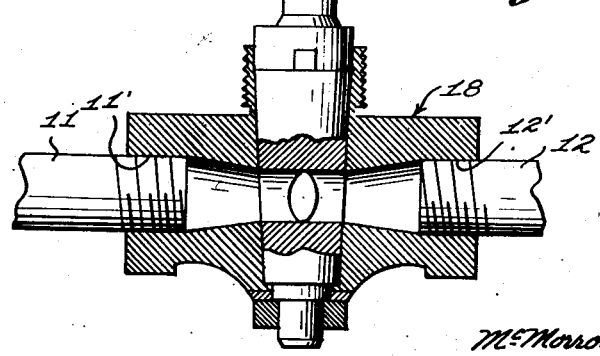
Figure 5 is a vertical cross sectional view taken through the two-way valve of Figure 4, showing the valve in normal position.

Connected to the other end of the transfer valve 10 is a conduit 11, said conduit being connected to one end of the remote control valve, designated at 18. The tractor booster unit 50 is of the type disclosed in Figure 15 of United States Patent No. 2,305,638 to Rockwell, patented December 22, 1942, and the outlet port 146 of such unit is connected to the opposite end of the remote control valve 18 by means of a conduit 12, the inlet fitting 137 of the booster unit 50 being connected to the vacuum line 34 by means of a conduit 19. The master brake cylinder 44 is connected to the fluid inlet fitting 118 of the booster unit 50 by means of a conduit 30. The fitting 118 is provided with a port 121 which serves for the purpose of delivering modulated hydraulic pressure to the vehicle wheel brakes, a conduit 32 being connected to port 121. The atmospheric air pressure is admitted to the booster unit 50 by means of a right angle pipe 143 leading from a breather chamber 144. Valve 18 is of the two-way type, as shown in Figures 4, 5 and 6. The conduit 11 is connected to one port of valve 18, shown at 11'. The conduit 12 is connected to another port of the valve 18, shown at 12'. The third port of the valve 18 is shown at 13' and is connected by a conduit 13 to the vacuum line 34. In the position of the valve shown in Figure 5, conduit 12 is in communication with conduit 11 and conduit 13 is closed off. Under these conditions, the transfer valve 10 is in a balanced position, as shown in Figure 2, and the control line 28 is closed off.

Figure 2:
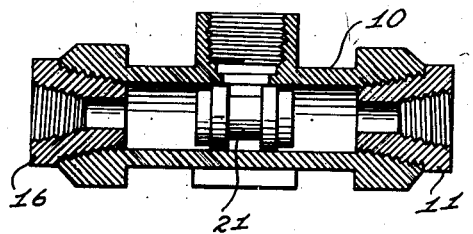
Figure 2 is a longitudinal cross sectional view taken through the transfer valve of the brake control system of Figure 1, said transfer valve being shown in neutral balanced condition.
Figure 3:
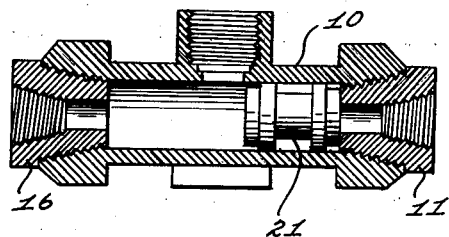
Figure 3 is a longitudinal cross sectional view similar to Figure 2, showing the transfer valve in an unbalanced condition wherein the trailer brakes are applied by operation of the hand control valve.

As shown in Figures 2 and 3, the transfer valve 10 has a slidable plunger 21 which is held in balanced position under normal conditions by the equal vacuum applied to the valve through the conduits 16 and 11. When the hand valve 20 is operated, the vacuum in conduit 16 is removed and atmospheric pressure is applied to the plunger 21, causing said plunger to move to the right, as viewed in Figure 3, whereby atmospheric pressure is applied to the control line 28, causing the trailer brakes to be actuated. Similarly, when the brake pedal, shown at 22, is depressed, fluid pressure in the master brake cylinder 44 is transmitted through the conduit 30 to the inlet fitting 118 of the foot brake controlled valve 50, causing said valve to operate in a manner similar to the operation of the hand control valve 20, thereby cutting off the vacuum in the conduits 12 and 11 and substituting atmospheric pressure therefore, whereby the plunger 21 is moved to the left, as viewed in Figures 2 and 3, causing atmospheric pressure to be applied to the line 28 and actuating the trailer brakes. The above describes the normal operation of the conventional trailer brake control system.

When it is desired to eliminate control of the trailer brakes by the brake pedal 22, the valve 18 is adjusted to the position shown in Figure 6, whereby the conduit 12 is closed off with respect to valve 18 and the conduit 13 is placed in communication with the conduit 11. Under these conditions, the trailer brakes can be operated only by operation of the hand control valve 20, and depression of the brake pedal 22 will have no effect on the trailer brakes. Therefore, when the brake pedal 22 is depressed, the plunger 21 of the transfer valve 10 will remain in its balanced centered position, shown in Figure 2, unless the hand valve 20 is operated. It will therefore be seen that by provision of the two-way control valve 18, operation of the trailer brakes by the depression of the brake pedal 22 can be eliminated at times and that the trailer brakes can be then controlled only by the hand valve 20.

While a specific embodiment of an improved brake control system for trailers has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a trailer brake control system of the type including a vacuum line, a control line, a transfer valve of the balanced type connected to said control line, a hand control valve, first conduit means connecting said hand control valve between said vacuum line and one side of the transfer valve, a tractor booster unit, a valve in said unit, and second conduit means connecting said unit between said vacuum line and the other side of said transfer valve, the improvement comprising valve means in said second conduit means arranged to connect the booster unit to the transfer valve, said valve means being further arranged to at times connect said vacuum line directly to said other side of the transfer valve and cut off the connection of said booster unit to the transfer valve.

2. In a trailer brake control system of the type including a vacuum line, a control line, a transfer valve of the balanced type connected to said control line, a hand control valve, first conduit means connecting said hand control valve between said vacuum line and one side of the transfer valve, a tractor booster unit, a valve in said unit, and second conduit means connecting said unit between said vacuum line and the other side of said transfer valve, the improvement comprising a two-way valve in said second conduit means arranged to connect the booster unit to the transfer valve, said two-way valve being further arranged to at times connect said vacuum line directly to said other side of the transfer valve and to cut off the connection of said booster unit to the transfer valve.

3. In a trailer brake control system of the type including a vacuum line, a control line, a transfer valve of the balanced type connected to said control line, a hand control valve, first conduit means connecting said hand control valve between said vacuum line and one side of the transfer valve, a tractor booster unit, a valve in said unit, and second conduit means connecting said unit between said vacuum line and the other side of said transfer valve, the improvements comprising a two-position manual valve connected in said second conduit means and connected to said vacuum line, said last-named valve being arranged in one position thereof to connect the booster unit to said other side of the transfer valve, and in the other position thereof to connect said vacuum line directly to said other side of the transfer valve and to cut off the connection of said booster unit to said other side.

References Cited in the file of this patent

UNITED STATES PATENTS

| Number | Name | Date |
|---|---|---|
| 1,650,487 | Bragg et al. | Nov. 22, 1927 |
| 2,305,638 | Rockwell | Dec. 22, 1942 |
| 2,451,139 | Williams et al. | Oct. 12, 1948 |
| 2,461,712 | Allin et al. | Feb. 15, 1949 |